(12) United States Patent
Matsuda et al.

(10) Patent No.: US 11,220,457 B2
(45) Date of Patent: Jan. 11, 2022

(54) MORTAR AND METHOD FOR PRODUCING THE SAME

(71) Applicant: SUMITOMO MITSUI CONSTRUCTION CO., LTD., Tokyo (JP)

(72) Inventors: Taku Matsuda, Tokyo (JP); Ryuichiro Mine, Tokyo (JP)

(73) Assignee: SUMITOMO MITSUI CONSTRUCTION CO., LTD., Tokyo (JP)

(*) Notice: Subject to any disclaimer, the term of this patent is extended or adjusted under 35 U.S.C. 154(b) by 0 days.

(21) Appl. No.: 16/961,185

(22) PCT Filed: Dec. 26, 2018

(86) PCT No.: PCT/JP2018/047849
§ 371 (c)(1),
(2) Date: Jul. 9, 2020

(87) PCT Pub. No.: WO2019/138879
PCT Pub. Date: Jul. 18, 2019

(65) Prior Publication Data
US 2021/0053873 A1    Feb. 25, 2021

(30) Foreign Application Priority Data
Jan. 10, 2018    (JP) ............... JP2018-001922

(51) Int. Cl.
*C04B 18/08*    (2006.01)
*C04B 18/14*    (2006.01)
(Continued)

(52) U.S. Cl.
CPC ............ *C04B 18/08* (2013.01); *C04B 7/13* (2013.01); *C04B 7/26* (2013.01); *C04B 18/144* (2013.01);
(Continued)

(58) Field of Classification Search
CPC .......... C04B 18/08; C04B 7/13; C04B 17/26; C04B 18/144; C04B 28/085;
(Continued)

(56) References Cited

U.S. PATENT DOCUMENTS

2012/0048133 A1    3/2012    Burberry et al.

FOREIGN PATENT DOCUMENTS

| CN | 105645895 A | 6/2016 |
|---|---|---|
| CN | 105819800 A | 8/2016 |

(Continued)

OTHER PUBLICATIONS

International Search Report and Written Opinion dated Mar. 26, 2019 in PCT/JP2018/047849 with English-language translation (10 pgs.).
(Continued)

*Primary Examiner* — Shuangyi Abu Ali
(74) *Attorney, Agent, or Firm* — Foley & Lardner LLP

(57) ABSTRACT

Mortar with small autogenous shrinkage strain and a method for producing the same are provided.
Mortar has binder and fine aggregate, wherein the binder includes cement and fine mineral powder, and the mortar is formed by being mixed with water. The fine aggregate is air granulated ferronickel slag, and weight ratio of water to a combination of the binder and the fine aggregate is 7.0% or more and 9.0% or less. Such mortar can be produced by mixing binder, fine aggregate and water.

3 Claims, 1 Drawing Sheet

(51) Int. Cl.
  *C04B 28/08* (2006.01)
  *C04B 7/13* (2006.01)
  *C04B 7/26* (2006.01)
  *C04B 40/00* (2006.01)

(52) U.S. Cl.
  CPC ........ *C04B 28/085* (2013.01); *C04B 40/0032* (2013.01); *C04B 40/0042* (2013.01)

(58) Field of Classification Search
  CPC . C04B 40/0032; C04B 40/0042; C04B 18/14; C04B 28/02; C04B 7/24; C04B 7/26; Y02P 40/10; Y02W 30/91
  See application file for complete search history.

(56) References Cited

FOREIGN PATENT DOCUMENTS

| | | | |
|---|---|---|---|
| CN | 106082871 A | 11/2016 | |
| CN | 106431105 A | 2/2017 | |
| CN | 106565174 A | 4/2017 | |
| CN | 106673554 | 5/2017 | |
| CN | 106747253 A | 5/2017 | |
| CN | 107056200 | 8/2017 | |
| CN | 107129199 A | 9/2017 | |
| JP | H8325047 | 12/1996 | |
| JP | H952744 A | 2/1997 | |
| JP | H0952744 A | * 2/1997 | |
| JP | 2009-051681 | 3/2009 | |
| JP | 2014-169213 A | 9/2014 | |
| JP | 2015-024948 A | 2/2015 | |
| JP | 2015024948 A | * 2/2015 | |
| JP | 2016-185888 A | 10/2016 | |
| KR | 20120048133 A | 5/2012 | |
| KR | 20120089881 A | 8/2012 | |
| TW | 200815312 A | 4/2008 | |
| WO | WO-2013/065940 | 5/2013 | |

OTHER PUBLICATIONS

Extended European Search Report dated Sep. 15, 2021, European Application No. 18899927.0, 11 pages.

* cited by examiner

MORTAR AND METHOD FOR PRODUCING THE SAME

CROSS-REFERENCE TO RELATED APPLICATIONS

This application is a National Stage Entry of International Appl. PCT/JP2018/047849, filed Dec. 26, 2018; the disclosure of which is incorporated by reference herein in its entirety.

TECHNICAL FIELD

The present invention relates to mortar and a method for producing the same.

This application is based on, and claims priority from, JP 2018-001922, filed on Jan. 10, 2018, the disclosure of which is hereby incorporated by reference herein in its entirety.

BACKGROUND OF THE INVENTION

In mortar, the desired goal is to limit autogenous shrinkage strain in order to prevent cracks. Patent Document 1 discloses that mortar with small autogenous shrinkage strain can be obtained by setting the porosity of fine aggregate at 16% or more.

Patent Document 1: JP 2016-185888

SUMMARY OF THE INVENTION

Patent Document 1 describes mortar whose properties are excellent for limiting the autogenous shrinkage strain, but it is necessary to further limit the autogenous shrinkage strain depending on the application.

The present invention aims at providing mortar with small autogenous shrinkage strain and a method for producing the same.

Mortar of the present invention comprises binder and fine aggregate, wherein the binder includes cement and fine mineral powder, and the mortar is formed by being mixed with water, and wherein the fine aggregate is air granulated ferronickel slag, and weight ratio of water to a combination of the binder and the fine aggregate is 7.0% or more and 9.0% or less.

A method for producing mortar of the present invention comprises the step of mixing binder, fine aggregate and water, wherein the binder includes cement and fine mineral powder, and wherein the fine aggregate is air granulated ferronickel slag, and weight ratio of water to a combination of the binder and the fine aggregate is 7.0% or more and 9.0% or less.

According to the present invention, it is possible to provide mortar with small autogenous shrinkage strain and a method for producing the same.

The above and other objects, features and advantages of the present invention will become apparent from the following description with reference to the accompanying drawings which illustrate examples of the present invention.

DETAILED DESCRIPTION OF THE INVENTION

Figure 1A:
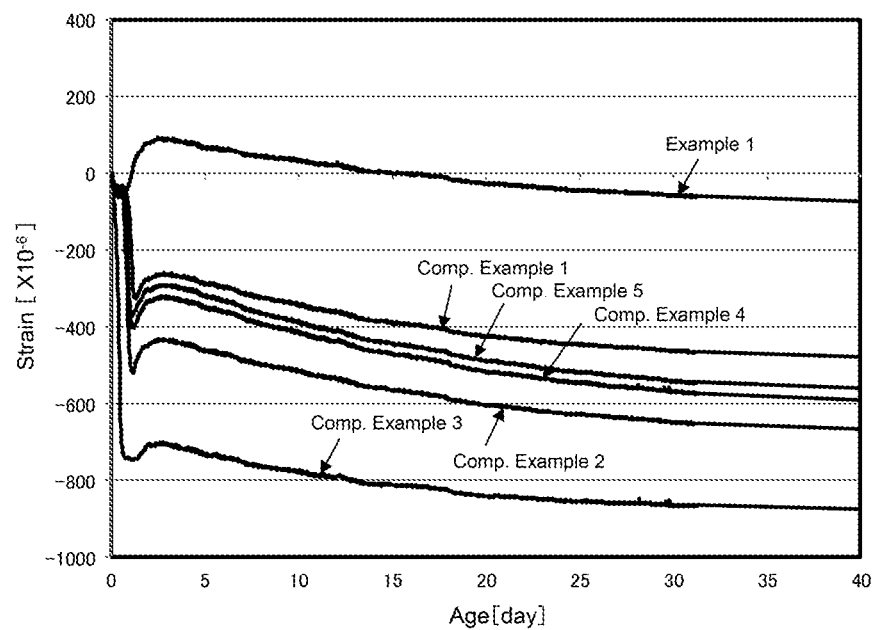
FIG. 1A is a graph showing autogenous shrinkage strain changing over time in Example and Comparative Examples.

Hereinafter, the present invention will be described with reference to Examples. The mortar of the present invention contains binder and fine aggregate, and is made by being mixed with water. In particular, the mortar of the present invention may be suitably used as grout.

The binder includes cement and fine mineral powder. The type of cement is not limited, and various types of Portland cements may be used, such as ordinary Portland cement, moderate-heat Portland cement, low-heat Portland cement, high-early-strength Portland cement, ultra-high-early-strength Portland cement and sulfate-resistant Portland cement; composite cements, such as Portland blast-furnace cement, Portland fly ash cement, Portland pozzolan cement and silica fume premix cement; super-rapid hardening cements, such as calcium-alumina cement and jet cement; and Irwin cement. The preferable content of cement is about 500 to 600 kg/m$^3$ for Portland cement and is about 600 to 1000 kg/m$^3$ for composite cement.

Ground granulated blast-furnace slag fine powder, fly ash, silica fume or the like may be used as fine mineral powder. The ground granulated blast-furnace slag fine powder is a by-product that is produced in the process of producing pig iron from iron ore, and contains CaO, SiO$_2$, Al$_2$O$_3$, MgO and the like. It is desirable that the ground granulated blast-furnace slag fine powder conform to JIS A 6206 "Ground granulated blast-furnace slag for concrete". The preferable content of the ground granulated blast-furnace slag is about 200 to 300 kg/m$^3$, although it depends on the content of other fine mineral powders. Fly ash is industrial waste that is generated in coal-fired power plants. Fly ash mainly contains SiO$_2$ and Al$_2$O$_3$. It is desirable that the fly ash conform to any one of I to IV specified in JIS A 6201 "Fly ash for use in concrete". The preferable content of the fly ash is about 150 to 350 kg/m$^3$. Silica fume is a by-product that is generated when silicon and ferrosilicon are produced in arc-type electric furnaces, and mainly contains SiO$_2$.

In order to cause these fine mineral powders to develop the performance as binder, an additive may be added to develop binding performance. An alkali stimulant, which alkalizes an aqueous solution when it is mixed with water, is preferably used as an additive to develop binding performance and, for example, an expansive additive may be used. An expansive additive elutes calcium-ion (Ca(OH)$_2$) when the additive is put in water, and preferably conforms to JIS A 6202 "Expansive additive for concrete". Calcium ions slowly react, at a room temperature, with CaO and SiO$_2$ that are contained in fine mineral powder to produce compounds having binding capacity. The preferable content of the expansive additive is about 10 to 30 kg/m$^3$.

In addition, the type of water is not limited. The preferable content of water is about 150 to 200 kg/m$^3$.

The fine aggregate is air granulated ferronickel slag (FNS). Ferronickel slag is a by-product that is generated when nickel is smelted from nickel ore. When raw material, such as nickel ore, is supplied to an electric arc furnace, the raw material is separated into ferronickel and slag in the electric arc furnace, and the slag is removed from the electric arc furnace. The slag is then blown with high pressure air and is separated into fine spherical particles. This process is called air granulation. The separated particles fly in the air and impinge against a wall. Meanwhile, the high-temperature particles are slowly cooled and are finally solidified into a spherical shape. Ferronickel slag thus produced effectively limits the autogenous shrinkage strain of mortar due to a hard surface and small heat shrinkage. In the present specification, the FNS that is produced in the air granulation process may hereinafter be referred to as air granulated FNS.

The water absorption rate of the fine aggregate is preferably 1.5% or more and 3.5% or less. Here, the water absorption rate is defined as (absorbed water weight/oven dry weight)×100(%). The absorbed water weight is the weight of water when the surface of the fine aggregate is dried (in the surface dry condition) and the internal pores of the fine aggregate are saturated with water, and the oven dry weight is the weight of the fine aggregate in the completely dried condition, that is, in the condition where no moisture is present on the surface and in the internal pores of the fine aggregate. In other words, the water absorption rate indicates the capacity of inner pores of fine aggregate to absorb water. Further, it is desirable that the equilibrium moisture content of the fine aggregate be 0.10% or more and 0.30% or less. The equilibrium moisture content is the moisture content when the fine aggregate is dried to a level where there are no further changes (decreases) in the moisture content. The equilibrium moisture content is, for example, determined as the saturation point that the moisture content reaches by drying the fine aggregate at a temperature of about 20° C. and at a relative humidity of about 95% after the fine aggregate is saturated with water. Experimental results show that fine aggregate that satisfies this condition is less apt to shrink, and therefore, the autogenous shrinkage strain of mortar can be limited by using such fine aggregate that is less apt to shrink. Fine aggregate that satisfies the condition includes Pamco Sand™ that is manufactured by Taiheiyo Metals Co., Ltd. Pamco Sand has a water absorption rate of 1.8-3.2% and an equilibrium moisture content of about 0.1-0.3%.

Large water absorption rate and small equilibrium moisture content mean that a larger amount of water is released from the fine aggregate and that water to be added is reduced. In general, the amount of water that is added in order to make mortar is determined on the assumption that fine aggregate is in the saturated condition. Therefore, fine aggregate having a large water absorption rate and a small equilibrium water content plays a more important role as a source of water than ordinary fine aggregate. Although a detailed mechanism is not clear, it is presumed that a large amount of water that is retained in the inner pores of the fine aggregate affects the reaction mechanism between cement and water and contributes to limiting the autogenous shrinkage strain of mortar. In the mortar of the present invention, the weight ratio of water to the combination of binder and the fine aggregate (W/(B+S)) is preferably 7.0% or more and 9.0% or less, and more preferably 7.5% or more and 8.8% or less. Since the weight ratio of water to materials is about 10 to 20% in a standard formulation of commonly available non-shrink grout (Comparative Examples 6 to 8), the weight ratio of water to the combination of the binder and the fine aggregate in the present embodiment is smaller than that. Therefore, the fact that W/(S+B) is 7% or more and 9% or less means that the ratio of water is smaller than that of ordinary mortar or that the ratio of the binder and fine aggregate is larger than that of ordinary mortar.

Examples

Several types of mortar having different fine aggregate and the same components except the fine aggregate were prepared and compressive strength and autogenous shrinkage strain were measured (see Table 1). Specifically, after the mortar was made by mixing cement, fly ash, fine aggregate and chemical admixture with water, the compressive strength of the mortar was measured at the age of the $7^{th}$ day and $28^{th}$ day, and the change of the autogenous shrinkage strain of the mortar over time was measured until the age of the $40^{th}$ day. Silica fume premix cement (SFPC) was used as cement, fly ash (FA) was used as fine mineral powder, and a high-performance water reducing admixture was used as a chemical admixture. Regarding fine aggregate, the air granulated FNS (trade name Pamco Sand™) was used in Example 1, and the materials listed in Table 2 were used in Comparative Examples 1 to 5. The fine aggregate used in Comparative Example 1 is FNS, but unlike Example 1, it is produced in water granulation process (molten slag is rapidly cooled with water or the like and is then pulverized). Detailed specification of each material is given in Table 2.

The autogenous shrinkage strain was measured in accordance with "Super flowing concrete research committee report (II), Appendix 1, Test method for autogenous shrinkage of high flowing concrete (Japan Concrete Institute (JCI), published on May 1994)" of JCI. Specifically, Teflon (registered trademark) sheets were fixed to the inner surface of formworks (a prismatic formwork having inner dimensions of 10×10×40 cm), mortar was then filled in the formworks, and a strain gauge (KM-100BT, manufactured by Tokyo Measuring Instruments Laboratory Co., Ltd.) was embedded in the central part of the mortar to prepare specimens. Then, after the formworks were removed, the surface of each specimen was sealed by an aluminum foil adhesive sheet in order to prevent drying, and each specimen was cured at a constant temperature of about 20° C. in a plastic bag, to measure the autogenous shrinkage strain. The compressive strength was measured in accordance with JIS A 1108 "Method of test for compressive strength of concrete".

TABLE 1

| | | Binder (B) [kg/m³] | | | | | | Weight ratio of fine | Fine | Fine | Water- (binder and fine |
|---|---|---|---|---|---|---|---|---|---|---|---|
| | Water (W) [kg/m³] | Silica fume premix cement (SFPC) | Fly ash (FA) | Fine aggregate (S) [kg/m³] | chemical admixture (SP) [kg/m³] | Sealing/ drying | Water-binder ratio W/B [%] | aggregate S/ (W + B + EX + S) [%] | aggregate-water ratio S/W [%] | aggregate-binder ratio S/B [%] | aggregate) ratio W/ (B + S) [%] |
| Example 1 | 180 | 800 | 200 | FNS (Pamco Sand) | 1282 | 14.00 | Sealing | 18 | 52.1 | 712.1 | 128.2 | 7.89 |
| Comp. Example 1 | 180 | 800 | 200 | FNS (Green Sand) | 1317 | 14.00 | Sealing | 18 | 52.7 | 731.8 | 131.7 | 7.77 |
| Comp. Example 2 | 180 | 800 | 200 | Copper slag fine aggregate | 1548 | 10.00 | Sealing | 18 | 56.7 | 859.9 | 154.8 | 7.06 |

TABLE 1-continued

| | Water (W) [kg/m³] | Binder (B) [kg/m³] Silica fume premix cement (SFPC) | Binder (B) [kg/m³] Fly ash (FA) | Fine aggregate (S) [kg/m³] | | chemical admixture (SP) [kg/m³] | Sealing/ drying | Water-binder ratio W/B [%] | Weight ratio of fine aggregate S/ (W + B + EX + S) [%] | Fine aggregate-water ratio S/W [%] | Fine aggregate-binder ratio S/B [%] | Water-(binder and fine aggregate) ratio W/ (B + S) [%] |
|---|---|---|---|---|---|---|---|---|---|---|---|---|
| Comp. Example 3 | 180 | 800 | 200 | Pulverized andesite | 1158 | 14.00 | Sealing | 18 | 49.5 | 643.1 | 115.8 | 8.34 |
| Comp. Example 4 | 180 | 800 | 200 | Pulverized hard sandstone | 1158 | 14.00 | Sealing | 18 | 49.5 | 643.1 | 115.8 | 8.34 |
| Comp. Example 5 | 180 | 800 | 200 | Pulverized limestone | 1211 | 14.00 | Sealing | 18 | 50.6 | 672.7 | 121.1 | 8.14 |

Note)
Pamco Sand is a registered trade mark

TABLE 2

| | Name | Properties | Brand etc. |
|---|---|---|---|
| | Water (W) | — | Tap Water |
| Binder (B) | Silica fume premix cement (SFPC) | Density: 3.04 Specific surface area: 5,780 cm²/g | TAIHEIYO CEMENT CORPORATION |
| | Fly ash (FA) | Density: 2.40 Specific surface area: 5,540 cm²/g | Yonden Business Co., Inc |
| Fine aggregate (S) | FNS (Pamco Sand) | Density: 2.89 Water absorption rate: 2.81% | PACIFIC METALS CO., LTD. |
| | FNS (Green Sand) | Density: 2.97 Water absorption rate: 0.95% | Hyuga Smelting Co., Ltd. |
| | Copper slag fine aggregate | Density: 3.49 Water absorption rate: 0.63% | Sumitomo Metal Mining Co., Ltd. |
| | Pulverized andesite | Density: 2.61 Water absorption rate: 2.81% | Otsuki city, Yamanashi pref. |
| | Pulverized hard sandstone | Density: 2.61 Water absorption rate: 1.24% | Kanuma city, Tochigi pref. |
| | Pulverized limestone | Density: 2.62 Water absorption rate: 1.81% | Sano city, Tochigi pref. |
| Chemical admixture (SP) | High-performance water reducing admixture | Polycarboxylic acid type | Sika Ltd. |

Note)
Pamco Sand is a registered trade mark

Table 3 shows the compressive strength and the autogenous shrinkage strain at the age of the 7$^{th}$ and 28$^{th}$ day. Further, FIG. 1A shows the change of the autogenous shrinkage strain of Example 1 and Comparative Examples 1 to 5 over time. It can be seen from this that the mortar using the air granulated FNS as fine aggregate largely limits the autogenous shrinkage strain, as compared to the mortar of Comparative Examples 1 to 5. Further, the mortar of Example 1 shows larger compressive strength than the mortar of Comparative Examples 1 to 5. Table 3 also shows the test results for the freshly mixed mortar. There is a small variation in the amount of air, but it does not significantly affect the compressive strength and the autogenous shrinkage strain because it is within a general numerical range. Slump flow is measure of flowability of mortar, and was measured in accordance with JIS A 1150 "Method of test for slump flow of concrete". JP funnel 14 is also measure of flowability of mortar, and was measured in accordance with Japan Society of Civil Engineers Standard JSCE-F541-1999 "Method of test for flowability of filled mortar". JP funnel 14 is time (in seconds) until the flow of mortar, that is filled in a funnel of a predetermined size, breaks first after it is allowed to flow out from the bottom outlet. The larger the slump flow and the smaller the JP funnel 14, the larger is the flowability of mortar. Example 1 exhibits rather good flowability in terms of the slump flow and the JP funnel 14, which are the same level as or better than Comparative Examples 1 to 5. Thus, the mortar of the present invention can be suitably utilized as a material for grout.

TABLE 3

| | Test results for the freshly mixed mortar | | | | | Compressive strength [N/mm²] (Sealed at 20° C.) | | Autogenous shrinkage strain [×10⁻⁶] (Sealed at 20° C.) | |
|---|---|---|---|---|---|---|---|---|---|
| | Slump flow [mm] | JP funnel 14 [SEC] | Air [%] | Mortar temperature [° C.] | Ambient Temperature [° C.] | 7th day | 28th day | 7th day | 28th day |
| Example 1 | 330 | 66 | 2.0 | 25.5 | 20.3 | 126 | 182 | 54 | −50 |
| Comp. Example 1 | 345 | 54 | 1.3 | 25.6 | 20.3 | 105 | 152 | −315 | −454 |
| Comp. Example 2 | 329 | 58 | 1.2 | 25.2 | 20.3 | 97.7 | 150 | −485 | −640 |
| Comp. Example 3 | 278 | 131 | 2.5 | 26.8 | 20.2 | 97.4 | 140 | −749 | −860 |
| Comp. Example 4 | 250 | 147 | 2.6 | 25.6 | 20.3 | 103 | 144 | −373 | −559 |
| Comp. Example 5 | 339 | 70 | 1.3 | 25.5 | 20.3 | 114 | 161 | −352 | −531 |

Figure 1B:
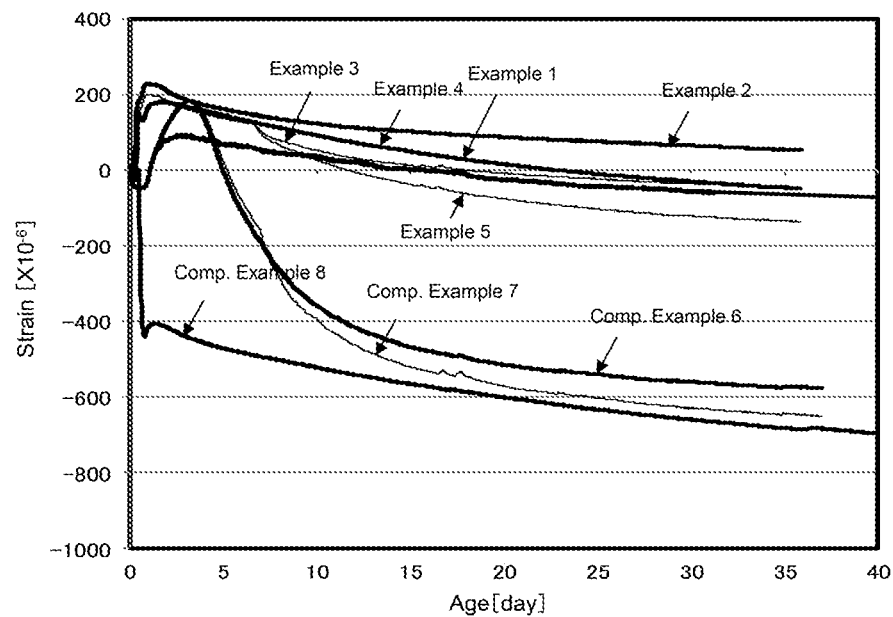
FIG. 1B is a graph showing autogenous shrinkage strain changing over time in Examples and Comparative Examples.

Next, in order to evaluate the effect of the differences of the binder and the sealing condition, mortar of Examples 2 to 5 was prepared and the same evaluation was performed (see Table 4). The materials listed in Table 5 were used in Examples 2 to 5. In Examples 2 to 5, high-early-strength Portland cement (HC) was used as cement. As the fine mineral powder, ground granulated blast-furnace slag fine powder (BF) and silica fume (SF) were used in Examples 2 and 3, and fly ash (FA) and silica fume (SF) were used in Examples 4 and 5. In addition, expansive additive was added in Examples 2 to 5. The air granulated FNS (trade name Pamco Sand™) was used as the fine aggregate, per Example 1. The water-binder ratio (W/B) was set at 20% in Examples 2 and 3, and was set at 18% in Examples 4 and 5. Examples 2 to 5 were sealed and maintained at an ambient temperature of 20° C., but in Examples 2 and 4, the sealing was continued until the age of the 40th day, while in Examples 3 and 5, the sealing was continued until the age of the 7th day and then the mortar were naturally dried. Table 6 shows the compressive strength and the autogenous shrinkage strain at the age of the 7th and the 28th days. FIG. 1B shows the change of the autogenous shrinkage strain of Examples 1 to 5 over time. It should be noted that, in Examples 3, 5 and Comparative Example 7, the sum of the autogenous shrinkage strain and the drying shrinkage strain is shown. It can be seen from this that there is no significant difference in the compressive strength in Examples 1 to 5 (note that the compressive strength at the age of 28th day was not measured in Examples 3 and 5) and that the autogenous shrinkage strain is limited. In other words, the effect of the difference of the binder and the sealing condition is limited. Of Examples 1 to 5, Example 1 exhibits the smallest autogenous shrinkage strain, and the change of the autogenous shrinkage strain over time is also small in Example 1. FIG. 1B shows measurements for commercially available mortar. Comparative Example 6 is obtained by sealing non-shrink mortar "Taiheiyo PRE-U-LOX" manufactured by Taiheiyo Material Co., Ltd. in the same manner as Examples 2 and 4. Comparative Example 7 is obtained by sealing "Taiheiyo PRE-U-LOX" until the age of the 7th day and then by naturally drying it in the same manner as Examples 3 and 5. Comparative Example 8 is obtained by sealing non-shrink mortar "TOTETSU-LITE H120" manufactured by Tokyotekko co., ltd in the same manner as Examples 2 and 4. The ratios of the binder and the fine aggregate are unknown in Comparative Examples 6 to 8. In general, when the weight ratio of water to the combination of the binder and the fine aggregate is small, the drying shrinkage is reduced, but the flowability deteriorates. However, as will be apparent from Table 6, it was confirmed that, despite the small weight ratio of water, the mortar of Examples 1 to 5 exhibits small autogenous shrinkage strain while ensuring flowability of the same level as commercially available non-shrink mortar (mortar of Comparative Examples 6 to 8)

TABLE 4

| | | Binder (B) [kg/m³] | | | | | | | |
|---|---|---|---|---|---|---|---|---|---|
| | | Cement | | Fine mineral powder | | | Expansive additive | | |
| | Water (W) [kg/m³] | High-early-strength Portland cement (HC) | Silica fume premix cement (SFPC) | Ground granulated blast-furnace slag fine powder (BF) | Fly ash (FA) | Silica fume (SF) | (EX) (Fine aggregate was relaced) [kg/m³] | Fine aggregate (S) [kg/m³] | Chemical admixture (SP) [kg/m³] |
| Example 1 | 180 | | 800 | | 200 | | | FNS (Pamco Sand) 1282 | 14.00 |
| Example 2 Example 3 | 190 | 523 | | 285 | | 143 | 20 | FNS (Pamco Sand) 1330 FNS (Pamco Sand) | 13.31 |
| Example 4 Example 5 | 190 | 581 | | | 317 | 158 | 20 | FNS (Pamco Sand) 1159 FNS (Pamco Sand) | 19.01 |

TABLE 4-continued

| | | | | | | |
|---|---|---|---|---|---|---|
| Comp. Example 6 | 338 | | | 1923 | | |
| Comp. Example 7 | | | | | | |
| Comp. Example 8 | 267 | | | 2083 | | |

| | Water mixed per bag [L/bag] | Sealing/drying | Water-binder ratio W/B [%] | Weight ratio of fine aggregate S/(W + B + EX + S) [%] | Fine aggregate-water ratio S/W [%] | Fine aggregate-binder ratio S/B [%] | Water-(binder and fine aggregate) ratio W/(B + S) [%] |
|---|---|---|---|---|---|---|---|
| Example 1 | | Sealing | 18 | 52.1 | 712.1 | 128.2 | 7.89 |
| Example 2 | | Sealing | 20 | 54.2 | 700.0 | 137.0 | 8.26 |
| Example 3 | | Sealing->drying | | | | | |
| Example 4 | | Sealing | 18 | 48.6 | 610.0 | 107.7 | 8.50 |
| Example 5 | | Sealing->drying | | | | | |
| Comp. Example 6 | 4.4 | Sealing | — | — | — | — | 17.60 |
| Comp. Example 7 | | Sealing->drying | | | | | |
| Comp. Example 8 | 3.2 | Sealing | — | — | — | — | 12.80 |

Note)
Pamco Sand is a registered trade mark

TABLE 5

| | Name | Properties | Brand etc. |
|---|---|---|---|
| | Water (W) | — | Tap Water |
| Binder (B) | High-early-strength Portland cement (HC) | Density: 3.14 Specific surface area: 4,470 cm$^2$/g | TAIHEIYO CEMENT CORPORATION |
| | Silica fume premix cement (SFPC) | Density: 3.04 Specific surface area: 5,780 cm$^2$/g | TAIHEIYO CEMENT CORPORATION |
| | Ground granulated blast-furnace slag fine powder (BF) | Density: 2.89 Specific surface area: 4,400 cm$^2$/g | DC CO., LTD. |
| | Fly ash (FA) | Density: 2.40 Specific surface area: 5,540 cm$^2$/g | Yonden Business Co., Inc |
| | Silica fume (SF) | Density: 2.20 Specific surface area: 200,000 cm$^2$/g | TOMOE Engineering Co., Ltd. |
| Fine aggregate (S) | FNS (Pamco Sand) | Density: 2.89 Water absorption rate: 2.81% | PACIFIC METALS CO., LTD. |
| | Expansive additive (EX) | Density: 3.19 Specific surface area: 4,970 cm$^2$/g | Taiheiyo Materials Corporation. |
| Chemical admixture (SP) | High-performance water reducing admixture | Polycarboxylic acid type | Sika Ltd. |

Note)
Pamco Sand is a registered trade mark

TABLE 6

| | Test results for the freshly mixed mortar | | | | | Compressive strength [N/mm$^2$] (Sealed at 20° C.) | | Autogenous shrinkage strain[*1] [×10$^{-6}$] (Sealed at 20° C.) | |
|---|---|---|---|---|---|---|---|---|---|
| | Slump flow [mm] | JP funnel 14 [SEC] | Air [%] | Mortar temperature [° C.] | Ambient Temperature [° C.] | 7$^{th}$ day | 28$^{th}$ day | 7$^{th}$ day | 28$^{th}$ day |
| Example 1 | 330 | 66 | 2.0 | 25.5 | 20.3 | 126 | 182 | 54 | −50 |
| Example 2 | 360 | 71 | 1.2 | 23.7 | 20.5 | 144 | 179 | 144 | 70 |
| Example 3 | | | | | | 144 | — | 104 | −31 |
| Example 4 | 310 | 72 | 1.6 | 23.9 | 20.6 | 137 | 189 | 123 | −22 |
| Example 5 | | | | | | 137 | — | 98 | −114 |
| Comp. Example 6 | 346 | 12 | 1.3 | 28.8 | 20.0 | 115 | 132 | −190 | −554 |
| Comp. Example 7 | | | | | | | — | −162 | −620 |

TABLE 6-continued

| | Test results for the freshly mixed mortar | | | | | Compressive strength [N/mm²] (Sealed at 20° C.) | | Autogenous shrinkage strain*¹ [×10⁻⁶] (Sealed at 20° C.) | |
|---|---|---|---|---|---|---|---|---|---|
| | Slump flow [mm] | JP funnel 14 [SEC] | Air [%] | Mortar temperature [° C.] | Ambient Temperature [° C.] | 7$^{th}$ day | 28$^{th}$ day | 7$^{th}$ day | 28$^{th}$ day |
| Comp. Example 8 | 295 | 66 | — | 27.7 | 21.1 | — | 147 | −492 | −648 |

Note)
*¹Sum of the autogenous shrinkage strain and the drying shrinkage strain are shown in Examples 3, 5 and Comp. Example 7

Although a certain preferred embodiment of the present invention has been shown and described in detail, it should be understood that various changes and modifications may be made without departing from the spirit or scope of the appended claims.

What is claimed is:

1. Mortar comprising binder and fine aggregate, wherein the binder includes cement and fine mineral powder, and the mortar is formed by being mixed with water,
    wherein the fine aggregate is air granulated ferronickel slag, and weight ratio of water to a combination of the binder and the fine aggregate is from 7.0% to 9.0%,
    and wherein JP funnel 14 is from 66 seconds to 72 seconds, and autogenous shrinkage strain is from −114×10⁻⁶ to 70×10⁻⁶ at an age of 28$^{th}$ day,
    wherein weight ratio of the fine aggregate to water is from 610% to 712%.

2. The mortar according to claim 1, wherein a water absorption rate of the fine aggregate is from 1.5% to 3.5%, and equilibrium moisture content is from 0.10% to 0.30%.

3. A method for producing mortar comprising a step of mixing binder, fine aggregate and water, wherein the binder includes cement and fine mineral powder,
    wherein the fine aggregate is air granulated ferronickel slag, and weight ratio of water to a combination of the binder and the fine aggregate is from 7.0% to 9.0%,
    and wherein JP funnel 14 is from 66 seconds to 72 seconds, and autogenous shrinkage strain is from −114×10⁻⁶ to 70×10⁻⁶ at an age of 28$^{th}$ day,
    wherein weight ratio of the fine aggregate to water is from 610% to 712%.

* * * * *